United States Patent [19]

Zeiser et al.

[11] Patent Number: 4,861,313

[45] Date of Patent: * Aug. 29, 1989

[54] ELASTOMERIC SHAFT COUPLING FOR CONCENTRIC SHAFTS

[75] Inventors: Philip Zeiser; John Readman, both of Rockford, Ill.

[73] Assignee: Sundstrand Corporation, Rockford, Ill.

[*] Notice: The portion of the term of this patent subsequent to Sep. 20, 2005 has been disclaimed.

[21] Appl. No.: 71,244

[22] Filed: Jul. 9, 1987

[51] Int. Cl.⁴ .......................... F16D 3/10; F16D 3/76
[52] U.S. Cl. ..................................... 464/89; 464/160
[58] Field of Search ...................... 464/89, 90, 91, 92, 464/160, 180

[56] References Cited

U.S. PATENT DOCUMENTS

| | | | |
|---|---|---|---|
| 2,154,077 | 4/1939 | Sampson | 464/89 X |
| 2,285,592 | 6/1942 | Ledwinka | |
| 2,491,734 | 12/1949 | Hirst | 464/90 |
| 2,556,624 | 6/1951 | Macbeth et al. | 464/92 |
| 2,727,485 | 12/1955 | Combs | |
| 2,790,312 | 4/1957 | Hagenlocher et al. | 464/90 |
| 2,822,676 | 2/1958 | Horovitz | 464/89 |
| 2,921,449 | 1/1960 | Jackel | 464/90 |
| 3,428,155 | 2/1969 | Binder et al. | 464/91 X |
| 3,503,224 | 3/1970 | Davidescu | 464/91 X |
| 4,012,923 | 3/1977 | Lundgren | 464/90 |
| 4,236,737 | 12/1980 | Herbert et al. | 464/89 X |
| 4,406,640 | 9/1983 | Franklin et al. | 464/91 |
| 4,516,956 | 5/1985 | Staiert | 464/89 |

Primary Examiner—Daniel P. Stodola
Attorney, Agent, or Firm—William D. Lanyi

[57] ABSTRACT

A dual concentric shaft coupling arrangement is provided with both inner and outer rotatable assemblies. An inner assembly comprises an inner rotatable driving member, an inner rotatable driven member and an inner rotatable intermediate member that is connected therebetween. An outer assembly comprises an outer rotatable driving member, an outer rotatable driven member and an outer rotatable intermediate member connected therebetween. Both the inner and outer rotatable intermediate members comprise first and second rigid portions which are connectable to the associated driving and driven members, respectively. Between the first and second rigid portions, a compliant portion is connected for the purpose of transmitting torque between the first and second rigid portions and, consequently, between the driving and driven members. Spline arrangements are also provided in a non-contact association with each other at low magnitudes of torque. At torque levels above a predetermined magnitude, the compliant portion permits deformation and relative rotation between the driving and driven members which moves the spline members into torque transmitting contact with each other. The radial alignment of the spline arrangements and associated compliant portions provides a degree of articulation between their associated driving and driven components.

8 Claims, 4 Drawing Sheets

ELASTOMERIC SHAFT COUPLING FOR CONCENTRIC SHAFTS

BACKGROUND OF THE INVENTION

1. Field of the Invention

The present invention relates generally to couplings for concentric shafts and, more particularly, to a concentric shaft coupling which incorporates a compliant member in conjunction with a spline arrangement as a component of each of two rotatable members, wherein the rotatable members are disposed in generally coaxial relation with each other.

2. Description of the Related Art

Concentric shafts are well known to those skilled in the art. For example, U.S. Pat. No. 2,727,485, which issued to Combs on Dec. 20, 1955, teaches the use of counter rotating shafts for a device which is used to transport freight over bodies of water. The submarine type sea train disclosed in this patent incorporates shafts which are arranged in both concentric and coaxial relation with each other along the length of a submarine for purposes of providing driving torque for the propellers of the vehicle.

U.S. Pat. No. 2,285,592, which issued to Ledwinka on June 9, 1942, discloses the use of counter rotating shafts that are arranged in concentric and coaxial relation with each other and are used to provide a driving force for a dual propeller system. The dual propellers are arranged to rotate about a common axis and are disposed proximate one another to neutralize the reaction torque of one propeller by the reverse rotation of the other propeller. Each of the propellers are driven by an internal gear with one q-ear being driven directly and the other gear being driven indirectly through an idler pinion.

U.S. Pat. No. 4,012,923, which issued to Lundgren on Mar. 22, 1977, discloses a vibration damping coupling which utilizes an elastomeric material. The device is used to transmit torque between at least two rotatable members. Each of the members have complimentary peripheral surface portions of non-circular cross-section with coupling members that comprise elastomer and metal layers disposed radially between driving and driven components. Each of the layers is disposed around a centerline with a generally hexagonal cross-section being described by each of the layers of both the elastomer and metal members.

U.S. Pat. No. 2,154,077, which issued to Sampson on Apr. 11, 1939, discloses the use of a compliant member disposed rad.:ally between an outer surface of one shaft and an inner surface of an associated shaft. The compliant member provides a drive coupling which is used as a universal joint to transmit torque between the coupled components. By yielding under stress, the compliant member accommodates misalignment and relative axial and angular displacement between the driving shaft and the driven shaft.

U.S. Pat. No. 4,516,956, which issued to Staiert on May 14, 1985, discloses a device which utilizes a compliant member to transmit torque between a driving shaft and a driven shaft. It also discloses a weld joint structure for use in assembling the elastomeric flexible coupling. Although this patent teaches the use of a spline connection between two of its components, the spline connection does not provide a back-up torque transmitting device for use when the compliant member deforms or fails.

U.S. Pat. No. 4,406,640, which issued to Franklin et al, on Sept. 27, 1983, discloses a drive axle assembly having a limited torsional damper. This axle assembly incorporates rubber bushings which are compressed between a shell and a canister. The drive axle assembly disclosed in this patent comprises a drive shaft with an integral flange at one end and a second drive shaft with an integral hollow head at an end adjacent the flange. The flange and head have cooperating lugs forming a lost motion positive drive assembly between the shafts. The assembly also includes a limited torsional damper comprising a shell welded to the flange, a canister welded to the head and a pair of rubber bushings compressed between the shell and the canister. Although this patent discloses the use of teeth which operate in a lost motion manner as a back up device for the rubber bushings, the rubber bushings and the lost motion device are displaced axially in a manner which would prevent the device from exhibiting the articulation ability that is sometimes necessary to accommodate misalignment of the input and output shafts. Furthermore, the lost motion lugs described in this patent do not transmit torque unless a failure occurs in the rubber bushing component and therefore are not arranged to normally share torque when the torque between the driving and driven members exceeds a predetermined magnitude.

Copending patent application Ser. No. 071,446, teaches the use of an elastomeric component in conjunction with a spline arrangement for the purpose of transmitting torque between a driving member and a driven member wherein the elastomeric, or compliant, component transmits the torque when the magnitude of the torque is less than a predefined value and, when the torque is greater than the predetermined magnitude, the torque transmission is shared between the compliant member and a spline arrangement.

SUMMARY OF THE INVENTION

The present invention provides a device which enables driving and driven shafts of a concentric shaft arrangement to be coupled together in a manner which permits relative rotation between the driving and driven members of each of the inner and outer components of the concentric shaft arrangement. The present invention comprises an inner rotatable driving member which has a first axis of rotation and an inner rotatable driven member which has a second axis of rotation. During normal operation, the first and second axes of rotation are aligned coaxially. Between the inner rotatable driving and driven members, an inner rotatable intermediate member is connected for the purpose of transmitting torque therebetween. The inner rotatable intermediate member has a first rigid portion connected to the inner rotatable driving member and a second rigid portion that is connected to the inner rotatable driven member. It is also provided with a compliant portion that is connected to both the first and second rigid portions. The second rigid portion of the inner rotatable intermediate member is provided with a plurality of spline teeth that are disposed in the interstices of a plurality of spline teeth which are connected to the inner rotatable driving member.

The present invention is also provided with an outer rotatable driving member which has a third axis of rotation and an outer rotatable driven member which has a fourth axis of rotation. During normal operation, the third and fourth axes of rotation are aligned coaxially. An outer rotatable intermediate member is connected to both the outer rotatable driving and driven members and is provided with both first and second rigid portions. The first and second rigid portions of the outer rotatable intermediate member are connected to the outer rotatable driving and driven members, respectively. A compliant portion is connected between the first and second rigid portions and the second rigid portion of the outer rotatable intermediate member is provided with a plurality of spline teeth that are disposed in the interstices of a plurality of spline teeth connected to the outer rotatable driving member. Both the inner rotatable intermediate member and the outer rotatable intermediate member are removably attached to their related components for purposes o facilitating assembly and disassembly of the present invention. In a preferred embodiment of the present invention, both the inner and outer rotatable intermediate members are configured to be generally identical with each other. This similarity in structure permits interreplacability which, in turn, reduces the complexity of assembly and permits a reduction in the number of required spare parts necessary to maintain equipment utilizing the shaft coupling of the present invention. Furthermore, in a preferred embodiment of the present invention, the inner and outer rotatable intermediate members are configured in such a way that they can be individually preassembled with their first and second rigid portions being prefabricated in connection with their compliant members for later assembly in association with their respective inner and outer rotatable driving and driven members.

In both the outer rotatable intermediate member and the inner rotatable intermediate member, the compliant portion is selected to permit the associated driving and driven assemblies to rotate relative to each other when the torque between the driving members and driven members exceeds a predetermined magnitude. In both of these rotatable intermediate members and their associated driving members, the spline teeth are arranged in non-contact relation with each other until a predetermined degree of deformation occurs in the compliant member. As this deformation occurs, relative rotation between the driving and driven components causes the spline teeth to move into contact relation with each other and, as a result, provides an alternate and complimentary torque transmission path between the driving and driven members.

The inner assembly and outer assembly of the present invention are configured to operate independently from each other. The inner assembly of the present invention comprises the inner rotatable driving member and the inner rotatable driven member along with the inner rotatable intermediate member and the outer assembly of the present invention comprises the outer rotatable driving member, the outer rotatable driven member and the outer rotatable intermediate member. The present invention is especially suitable for use in applications wherein counter rotating shafts are arranged in concentric and coaxial relation with each other. These types of applications arise in situations in which propellers are counter rotated for purposes of balancing the torque effect on a carrier assembly. However, it should be understood that the present invention can be used in cases where the concentric shafts are configured to rotate in either the same direction or, as described above, in opposite directions. The elastomeric device which provides the compliant member of the present invention serves several useful purposes. First, it permits a quiet coupling between the driving and driven shafts used in conjunction with the present invention. Also, when the compliant member deforms in response to magnitudes of torque which exceed a predetermined value, relative rotation between the driving and driven members causes a spline arrangement to share the torque transmitting function of the present invention between the spline arrangement and the compliant member. This occurs because of the fact that the teeth of one spline member move into contact with the teeth of the associated spline member when the driving component and driven component of the present invention experience relative rotation. Another function of the present invention is to permit a degree of articulation between the driving and driven shafts because of the fact that the compliant member and the spline arrangement are arranged in radial alignment with each other for both the inner coupling assembly and outer coupling assembly of the present invention. Additionally, the spline arrangement of the present invention provides a back up torque transmitting device for use if the compliant component fails.

BRIEF DESCRIPTION OF THE DRAWING

The present invention will be more fully understood by a reading of the description of the preferred embodiment in conjunction with the drawing, in which.

DESCRIPTION OF THE PREFERRED EMBODIMENT

Figure 1:
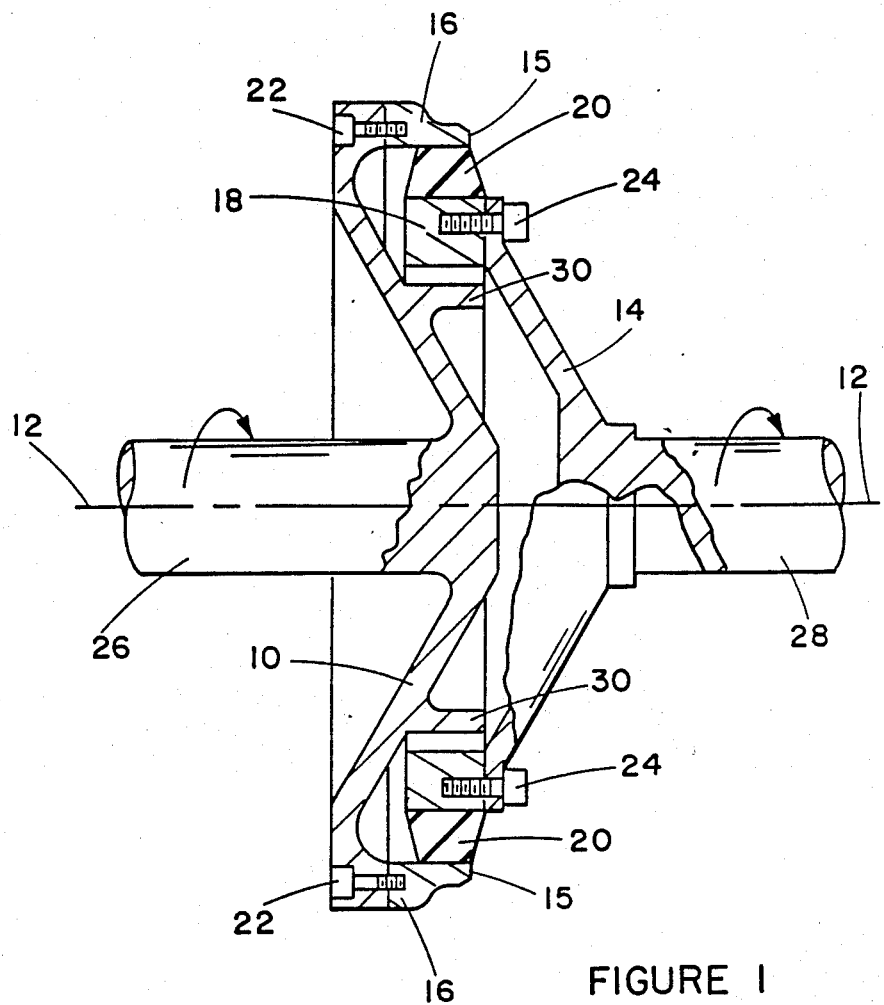
FIG. 1 illustrates the inner coupling component of the present invention.

FIG. 1 illustrates an inner rotatable assembly of the present invention. The inner rotatable assembly comprises an inner rotatable driving member 10 which has a first axis of rotation 12. An inner rotatable driven member 14 is also provided. The inner rotatable driven member 14 has a second axis of rotation which, as shown in FIG. 1, is generally coaxial with the first axis of rotation 12 of the inner rotatable driving member during normal operation. However, it should be understood that the inner rotatable driving member 10 and the inner rotatable driven member 14 are arranged in such a way that they can rotate about individual axes of rotation which are not coaxial with each other.

An inner rotatable intermediate member 15 is connected between the inner rotatable driving member 10 and the inner rotatable driven member 14. It is provided with a first rigid portion 16 and a second rigid portion 18 with a compliant portion 20 connected between the first 16 and second 18 rigid portions of the inner rotatable intermediate member 15. As can be seen in FIG. 1, the first portion 16 of the inner rotatable intermediate member 15 is connected to the inner rotatable driving member 10 and the second rigid portion 18 of the inner rotatable intermediate member is connected to the inner rotatable driven member 14.

As illustrated in FIG. 1, the inner rotatable intermediate member 15 is removably attached to both the inner rotatable driving and driven members. For example, bolts 22 provide a connection between the inner rotatable driving member 10 and the first rigid portion 16 of the inner rotatable intermediate member 15 and bolts 24 provide a connection between the inner rotatable driven member 14 and the second portion 18 of the inner rotatable intermediate member 15.

As illustrated in FIG. 1, the compliant member 20 is connected between the inner rotatable driving and driven members for the purpose of transmitting torque therebetween. If an inner driving shaft 26, which is attached to the inner rotatable driving member 10, is rotated in the direction shown by the arrow in FIG. 1, torque is transmitted by the compliant member 20 through the inner rotatable driven member 14 and to an inner driven shaft 28 which is shown connected to the inner rotatable driven member 14.

The inner rotatable intermediate member 15 is provided with a plurality of spline teeth on its second rigid portion 18. In FIG. 1, these spline teeth of the second rigid portion 18 are directed radially inward toward the axis of rotation 12 and are disposed within the interstices o a plurality of spline teeth connected to a portion 30 of the inner rotatable driving member 10. It should be understood that the spline teeth connected to the portion 30 of the inner rotatable driving member 10 are not always in contact with the spline teeth connected to the second rigid portion 18 of the inner rotatable intermediate member 15. The two spline members are arranged in noncontact relation with each other with the teeth of each spline member being disposed in the interstices of the teeth of the other spline member. During operation of the present invention at low magnitudes of torque, all of the torque transmitted between the inner driving shaft 26 and the inner driven shaft 28 is transmitted by the compliant portion 20 of the inner rotatable intermediate member 15. As the magnitude of the torque being transmitted increases, the compliant member will deform to permit a slight degree of relative rotation to occur between the first 16 and second 18 rigid portions of the inner rotatable intermediate member 15 and, as a result of this relative rotation, the inner rotatable driving member 10 will experience a rotation relative to the inner rotatable driven member 14 because of the attachment of the first 16 and second 18 rigid portions of the inner rotatable intermediate member 15 to the inner rotatable driving member 10 and inner rotatable driven member 14, respectively.

When this relative rotation occurs as the compliant member 20 deforms, the spline members described above will move into contact relation with each other and into torque transmitting relation between the second rigid portion 18 of the inner rotatable intermediate member 15 and the portion 30 of the inner rotatable driving member 10. This contact relation between the spline members occurs when the magnitude of torque between the inner rotatable driving and driven members exceeds a predetermined value. When the torque exceeds this predetermined value, the deformation of the compliant member 20 permits the spline teeth to move into torque transmitting relation with each other and, as a result of this movement, torque is also transmitted through the spline arrangement. It should be understood that, after the spline arrangement begins to transmit torque as described above, torque will be shared between the spline arrangement and the compliant member 20. It should also be understood that, as described above, the spline arrangement will transmit torque in the event that the compliant member 20 fails during operation and no longer is capable of transmitting torque between the inner rotatable driving member 10 and the inner rotatable driven member 14. Although the inner rotatable assembly of the present invention has been described in terms of driving and driven members, it should be understood that an alternative embodiment of the present invention could reverse the functions of these rotatable members. In other words, motive power could be provided to drive the inner rotatable driven member and torque could be provided through the inner rotatable intermediate member for the purpose of causing the rotation of the inner rotatable driving member. Therefore, the present invention should not be considered to be limited to any particular location of a prime mover and it should be understood that either the inner rotatable driving member 10 or the inner rotatable driven member 14 can be rotated by a prime mover with the resulting torque being transmitted through the inner rotatable intermediate member 15 to the other component of the present invention.

Figure 2:
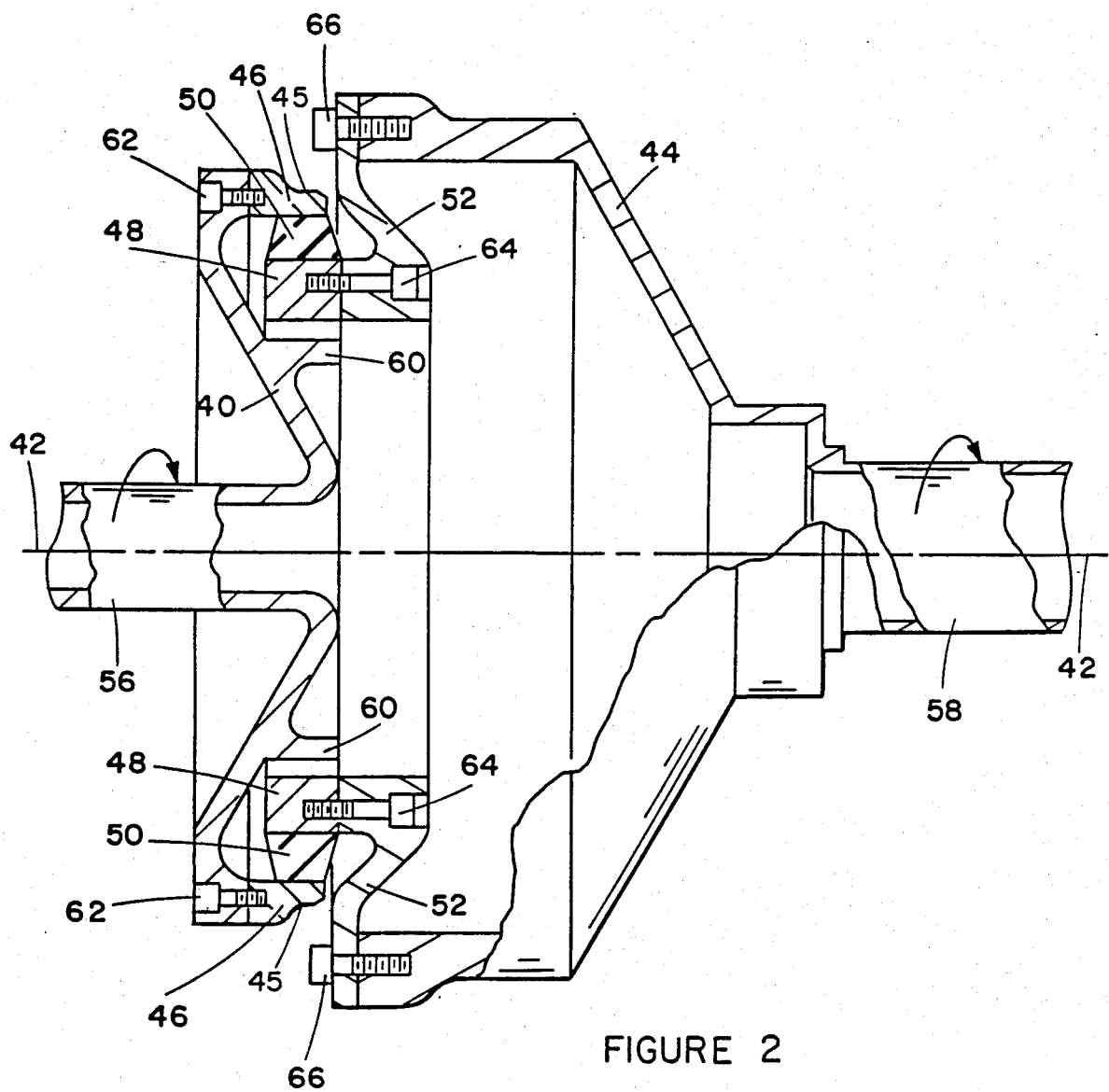
FIG. 2 illustrates the outer coupling component of the present invention.

FIG. 2 illustrates an outer rotatable assembly portion of the present invention. An outer rotatable driving member 40 is disposed around a third axis of rotation 42 and an outer rotatable driven member 44 is disposed around a fourth axis of rotation. In FIG. 2, the third and fourth axes of rotation are shown being coaxial with each other and coincident along the axis of rotation 42. An outer rotatable intermediate member, designated generally by reference numeral 45 in FIG. 2, comprises a first rigid portion 46 and a second rigid portion 48. Connected between the first and second rigid portions is a compliant portion 50.

An extension 52 is connected to the outer rotatable driven member 44 for the purposes of providing a means for connecting the outer rotatable driven member 44 to the outer rotatable intermediate member 45. As will be described in greater detail below, the inner rotatable assembly described above will be disposed radially inward from portions of the outer rotatable assembly described herein and the extension 52 provides a removable portion of the outer rotatable driven assembly to permit clearance for assembly of the inner and outer rotatable components of the present invention together. For the purposes of this discussion, the connection portion 52 will be considered as a part of the outer rotatable driven member 44.

As can be seen in FIG. 2, the outer rotatable intermediate member 45 is connected to both the outer rotatable driving member 40 and the outer rotatable driven member 44 in a manner similar to that described above in conjunction with the inner rotatable intermediate member 15. When an outer driving shaft 56 is rotated, as indicated by the arrow in FIG. 2, torque is transmitted through the outer assembly of the present invention to an outer driven shaft 58 which is caused to rotate in the direction indicated by the arrow in FIG. 2. This torque is transmitted by the compliant portion 50 of the outer rotatable intermediate member 45. As described above in conjunction with the inner rotatable intermediate member 15, the second rigid portion 48 of the outer rotatable intermediate member 45 is provided with a plurality of spline teeth which are disposed in the interstices of another plurality of spline teeth connected to a portion 60 of the outer rotatable driving member 40. At low magnitudes of torque, the compliant portion 50 transmits all of the torque between the outer rotatable driving member 40 and the outer rotatable driven member 44. However as the magnitude of torque transmission between the outer driving shaft 56 and the outer driven shaft 58 increases, the compliant portion 50 deforms to permit relative rotation to occur between the outer rotatable driving member 40 and the outer rotatable driven member 44. As this deformation occurs, the spline teeth begin to move into contact relation with each other and, after a predetermined magnitude of torque exists between the outer rotatable driving member 40 and the outer rotatable driven member 44, the spline members move into torque transmitting contact with each other and begin to share the total torque load between the driving components and driven components. At magnitudes of torque above this predetermined value, torque is transmitted between the outer rotatable driving member 40 and the outer rotatable driven member 44 through both the compliant portion 50 of the outer rotatable intermediate member 45 and the spline arrangement disposed between the second rigid portion 48 of the outer rotatable intermediate member 45 and the portion 60 of the outer rotatable driving member 40.

As can be seen in FIG. 2, bolts 62 provide a means for removably connecting the outer rotatable intermediate member 45 to the outer rotatable driving member 40. These bolts 62 connect the outer rotatable driving member 40 to the first rigid portion 46 of the outer rotatable intermediate member 45. Also, bolts 64 connect the second rigid portion 48 of the outer rotatable intermediate member 45 to the outer rotatable driven member 44. As described above, the extension portion 52 is considered to be a part of the outer rotatable driven member 44. In FIG. 2, the extension portion 52 is shown to be removably connected to the outer rotatable driven member 44 by bolts 66.

Figure 3:
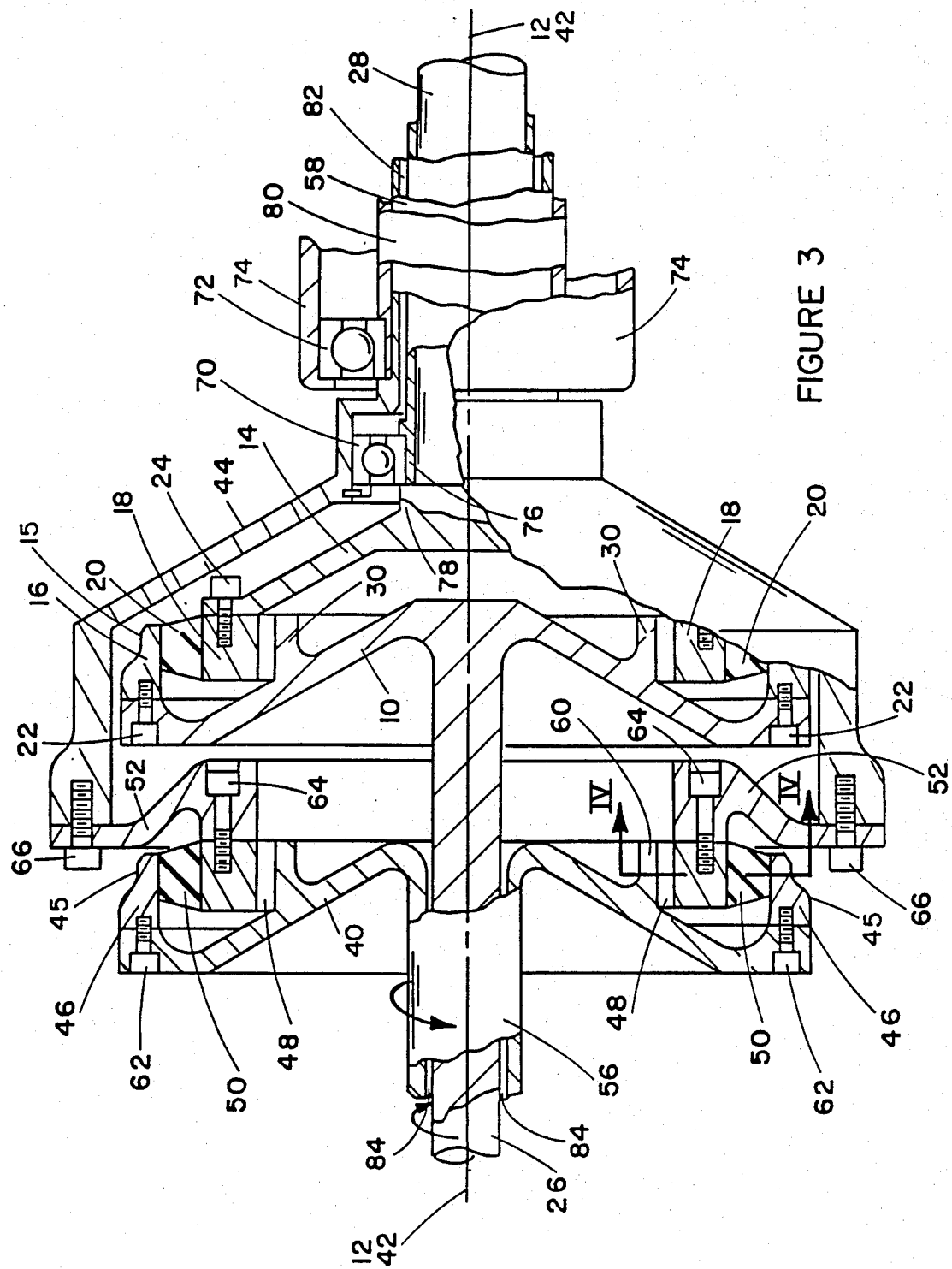
FIG. 3 illustrates the combination of both the inner and outer coupling components of the present invention.

FIG. 3 shows the assembly of the inner and outer components, shown in FIGS. 1 and 2, associated together for rotation about a common axis of rotation. Comparing FIGS. 1, 2 and 3, it can be seen that the first, second, third and fourth axes of rotation described above are all arranged coaxially along a single axis of rotation in FIG. 3. For purposes of this discussion, the axis of rotation shown in FIG. 3 is labeled both with reference numerals 12 and 42 to designate this relationship. It should be understood that a bearing assembly, is provided between the inner rotatable driven member 14 and the outer rotatable driven member 44. This bearing assembly 70 provides a degree of coaxial alignment of the inner 14 and outer rotatable driven members. Also shown in FIG. 3, a bearing assembly 72 is disposed between the outer 44 surface of the outer rotatable driven member 44 and a grounded member 74. The first bearing member 70 is held axially in place with a spacer 76 which is disposed around the inner rotatable driven shaft 28 to fix the axial location of the first bearing 70 between the spacer 76 and a portion 78 of the inner rotatable driven member 14. Similarly, a spacer 80 is provided in association around the outer rotatable driven shaft 58 for the purpose of holding the second bearing 72 axially in place. The bearings, 70 and 72, provide for relative rotation between the inner rotatable driven member 14 and the outer rotatable driven member 44 while maintaining a space between these coaxially disposed members. This space is shown by reference numeral 82 to indicate the clearance between the inner rotatable driven shaft 28 and the outer rotatable driven shaft 58 and reference numeral 84 to indicate the clearance between the inner rotatable driving shaft 26 and the outer rotatable driving shaft 56. It should be understood that additional supporting means (not shown in FIG. 3) would normally be provided to support the prime mover which rotates the inner and outer driving shafts.

The structure of both the inner 15 and outer 45 rotatable intermediate members permits both the inner and outer assemblies shown in FIG. 3 to possess a degree of articulation which permits the driving members and driven members to move into non-coaxial alignment with each other. This articulation is provided by the compliant members, 20 and 50, and the relative spacing of the spline members. It should be understood that the inner and outer rotatable intermediate members are constructed to dispose the spline members and the compliant members along a line of radial alignment for the purpose of providing this articulation. As an example, if the inner rotatable driving and driven members of the present invention move into non-coaxial alignment with each other, the intersection of their respective axes of rotation will be generally coincident with a plane drawn through the center of both the compliant member and the spline arrangement of the inner rotatable intermediate member. If the compliant portion and the spline arrangement were not arranged in generally radial alignment with each other, this articulation would not be possible because of the interference that would be provided by either one or both of these components. Both the inner and outer assemblies illustrated in FIG. 3 are provided with a specific criterion of radial alignment of the components of their rotatable intermediate members.

Figure 4:
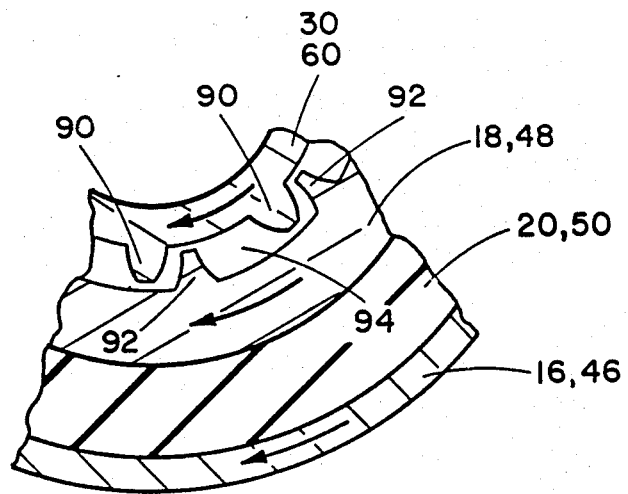
FIG. 4 illustrates a cross-sectional view of the intermediate outer connecting element of the present invention.

FIG. 4 is a section view taken through the outer rotatable intermediate member 45 in FIG. 3. However, it should be clearly understood that the inner 15 and outer 45 rotatable intermediate members are generally identical to each other in the present invention and the section view shown in FIG. 4 could also represent the inner rotatable intermediate member 15 shown in FIGS. 1 and 3. For this reason, these components in FIG. 4 will be designated by both reference numerals which could alternatively represent their reference numerals in either the inner rotatable intermediate member 15 or the outer rotatable intermediate member 45. As can be seen in FIG. 4, the first rigid portion 16 is connected to the second rigid portion 18 by a compliant portion 20 connected therebetween. As the first rigid portion 16 rotates, as indicated by its arrow, torque is transmitted through the compliant portion 20 to the second rigid portion 18 which is attached to the rotatable driven member of the present invention. The portion 30 of the rotatable driving member rotates in rigid connection with the first rigid portion 16. Therefore, as torque between the driving and driven members increases, a deformation can occur within the compliant portion 20. The spline teeth 90, shown schematically in FIG. 4, which are connected to the portion 30 of the rotatable driving member, move rotationally relative to the second rigid portion 18 and its spline teeth 92. The space 94 between these spline teeth will continue to decrease until the spline teeth 90 move into contact with the spline teeth 92 and provide a torque transmitting means between the rotatable driving and driven members. When this occurs, torque will be transmitted through two complimentary torque transmission paths. One torque transmission path will comprise the compliant portion 20 of the rotatable intermediate member and the other torque transmission path will comprise the spline arrangement disposed between the second rigid portion 18 of the rotatable intermediate member 15.

Referring again to FIG. 4, it should be understood that the space 94 between the teeth 90 and the teeth 92 will be at its maximum dimension when the present invention is operating at no torque or low torque magnitudes. As the torque between the driving and driven components increases, the deformation of the compliant portion 20 will increase and the magnitude of relative rotation between the driving and driven components will increase. This relative rotation will cause the space 94 to decrease as the teeth 90 move toward the teeth 92. In FIG. 4, this relative movement of the teeth 90 to the teeth 92 can be illustrated by imagining that the second rigid portion 18 is stationary and the portion 30 moves in a clockwise direction. As this relative motion occurs, the teeth 90 will move clockwise into eventual contact with the teeth 92 and will dispose the spline member of the portion 30 into contact and torque transmitting relation with the teeth 92 of the spline member of the second rigid portion 18.

It should be understood that, in a preferred embodiment of the present invention, the inner and outer rotatable intermediate members (i.e. reference numeral 15 and 45) are identical in structure to each other. Their first rigid portions (i.e. reference numerals 16 and 46) are identical to each other and their second rigid portions (i.e. reference numerals 18 and 48) are identical to each other along with their compliant portions (i.e. reference numerals 20 and 50). Therefore, the inner and outer rotatable intermediate members can be interchanged because of this similarity of these components. This similarity, which is permitted by the overall structure of the present invention, reduces the cost of the concentric coupling.

Referring again to FIG. 3, it can be seen that the structure of the present invention permits ease of assembly and disassembly. For example, it should be apparent that the inner rotatable driving member 10 and the outer rotatable driving member 40 can be disconnected from their respective rotatable intermediate members and removed, in an axial direction toward the left, for the purpose of performing maintenance on the inner and outer rotatable driven members or, for any other reason. The identical structure of the inner and outer rotatable intermediate members permits a reduction in spare parts requirements and its modular structure permits the first and second rigid portions to be prefabricated and attached to the compliant portion as a separate subassembly prior to the connection of the rotatable intermediate member to the other components.

Although the present invention has been described with particular specificity and illustrated with significant detail, it should be understood that many other alternative embodiments are to be considered within the scope of the present invention. As discussed above, it should also be understood that the inner and outer rotatable driven members can be alternatively connected to a prime mover and used to drive the inner and outer rotatable driving members. In other words, although the present invention has been described in terms of torque being provided to rotate the driving members which then cause the driven members to rotate, the opposite configuration of the present invention is equally operable. In the description of the preferred embodiment, it has been assumed that a prime mover is connected to the driving shafts which are, in turn, connected to the inner and outer rotatable driving members with the inner and outer rotatable driven members being connected to a device which is to be driven. However, the opposite configuration is equally possible within the scope of the present invention. A prime mover could be connected to the inner and outer driven shafts which are connected to the inner and outer rotatable driven members. In this configuration, torque will be transmitted through the inner and outer rotatable intermediate members to the inner and outer rotatable driving members for the purpose of driving the inner and outer driving shafts which could be connected to devices which are to be rotated. Therefore, either of these two configurations should be considered to be within the scope of the present invention along with alternative embodiments of the individual components described above.

What I claim is:

1. A concentric shaft coupling, comprising:

an inner driving member rotatable about a first axis of rotation;

an inner driven member rotatable about a second axis of rotation, said inner driven member being removably connected to said inner driving member to form an inner coupling assembly;

an inner intermediate member removably attached between said inner driving and driven members;

said inner intermediate member comprising a first compliant portion disposed to transmit torque between said inner driving and driven members;

a first spline arrangement disposed between said inner driving member and said inner intermediate member, said first spline arrangement having a plurality of mating teeth being disposed in non-contact relation, said plurality of mating teeth being movable into a torque transmitting relation upon the occurrence of a first deformation of said first compliant portion wherein said inner driving and driven members move rotationally relative to each other;

said inner intermediate member comprising a first rigid portion and a second rigid portion, said first compliant portion being disposed radially between said first and second rigid portions of said inner intermediate member, said first compliant member being disposed radially outward from said second rigid portion of said inner intermediate member, said first compliant portion of said inner intermediate member being disposed in radial alignment with said second rigid portion of said inner intermediate member, said second rigid portion of said inner intermediate member having a plurality of spline teeth extending radially inward and disposed in the interstices of a plurality of spline teeth of said inner driving member extending radially outward to form said first spline arrangement;

said first compliant member being selected to permit said first deformation upon the occurrence of a predetermined magnitude of torque between said inner driving and driven members;

an outer driven member rotatable about a third axis of rotation;

an outer driving member rotatable about a fourth axis of rotation, said outer driven member being removably connected to said outer driving member to form an outer coupling assembly;

an outer intermediate member removably attached between said outer driving and driven members;

said outer intermediate member comprising a second compliant portion disposed to transmit torque between said outer driving and driven members;

a second spline arrangement disposed between said outer driven member and said outer intermediate member, said second spline arrangement having a plurality of mating teeth being disposed in noncontact relation, said plurality of mating teeth being movable into torque transmitting relation upon the occurrence of a second deformation of said second compliant portion wherein said outer driving and driven members move rotationally relative to each other;

said outer intermediate member comprising a first rigid portion and a second rigid portion, said second compliant portion being disposed radially between said first and second rigid portions of said outer intermediate member, said second compliant member being disposed radially outward from said second rigid portion of said outer intermediate member, said second compliant portion of said outer intermediate member being disposed in radial alignment with said second rigid portion of said outer intermediate member, said second rigid portion of said outer intermediate member having a plurality of spline teeth extending radially inward and disposed in the interstices of a plurality of spline teeth of said outer driving member extending radially outward to form said second spline arrangement;

said second compliant member being selected to permit said second deformation upon the occurrence of a predetermined magnitude of torque between said outer driving and driven members;

an inner driving shaft, connected to said inner driving member, being rotatable about said first axis of rotation; and an outer driving shaft, connected to said outer driving member, being rotatable about said third axis of rotation, said outer driving shaft being a hollow cylinder, said inner driving shaft being disposed within said outer driving shaft, said first and third axis of rotation being aligned coaxially.

2. The coupling of claim 1, wherein:
said inner and outer rotatable intermediate members are interchangeable.

3. The coupling of claim 2, wherein:
said inner and outer rotatable intermediate members are identical.

4. A concentric shaft coupling, comprising:
an inner rotatable driving member having a first axis of rotation;
an inner rotatable driven member having a second axis of rotation;
an inner rotatable intermediate member being connected to said inner rotatable driving and driven members, said inner rotatable intermediate member having a first rigid portion connected to said inner rotatable driving member and a second rigid portion connected to said inner rotatable driven member, said inner rotatable intermediate member having a compliant portion connected to said first and second rigid portions of said inner rotatable intermediate member, said second rigid portion of said inner rotatable intermediate member having a plurality of spline teeth disposed in the interstices of a plurality of spline teeth connected to said inner rotatable driving member, said compliant portion of said inner rotatable intermediate member being disposed radially outward from and in radial alignment with said second rigid portion of said inner rotatable intermediate member, said compliant portion of said inner rotatable intermediate member being disposed radially between said first and second rigid portions of said inner rotatable intermediate member;

an outer rotatable driving member having a third axis of rotation;

an outer rotatable driven member having a fourth axis of rotation;

an outer rotatable intermediate member being connected to said outer rotatable driving and driven members, said outer rotatable intermediate member having a first rigid portion connected to said outer rotatable driving member and a second rigid portion connected to said outer rotatable driven member, said outer rotatable intermediate member having a compliant portion connected to said first and second rigid portions of said outer rotatable intermediate member, said second rigid portion of said outer rotatable intermediate member having a plurality of spline teeth disposed in the interstices of a plurality of spline teeth connected to said outer rotatable driving member, said compliant portion of said outer rotatable intermediate member being disposed radially outward from and in radial alignment with said second rigid portion of said outer rotatable intermediate member, said compliant portion of said outer rotatable intermediate member being disposed radially between said first and second rigid portions of said outer rotatable intermediate member;

said inner rotatable intermediate member being removably attached to said inner rotatable driving member and said inner rotatable driven member;

said outer rotatable intermediate member being removably attached to said outer rotatable driving member and said outer rotatable driven member;

said compliant portion of said inner rotatable intermediate member being selected to transmit torque between said first and second rigid portions of said inner rotatable intermediate member and deform to permit relative rotational movement between said first and second portions of said inner rotatable intermediate member upon the occurrence of a preselected magnitude of said torque;

said compliant portion of said outer rotatable intermediate member being selected to transmit torque between said first and second rigid portions of said outer rotatable intermediate member and deform to permit relative rotational movement between said first and second portions of said outer rotatable intermediate member upon the occurrence of a preselected magnitude of said torque;

said inner rotatable driving member being connected to an inner driving shaft and said inner rotatable driven member is connected to an inner driven shaft;

said outer rotatable driving member being connected to an outer driving shaft and said outer rotatable driven member is connected to an outer driven shaft;

said outer driving shaft being a cylinder and said inner driving shaft being disposed in coaxial and concentric relation with said outer driving shaft within said outer driving shaft;

said outer driven shaft being a cylinder and said inner driven shaft being disposed in coaxial and concentric relation with said outer driven shaft within said outer driven shaft;

said plurality of spline teeth of said second rigid portion of said inner rotatable intermediate member being disposed in non-contact relation with said plurality of spline teeth connected to said inner rotatable driving member, said compliant portion of said inner rotatable intermediate member being deformable to permit said plurality of spline teeth of said second rigid portion of said inner rotatable intermediate member to move into contact with said plurality of spline teeth connected to said inner rotatable member upon the occurrence of a predetermined magnitude of torque between said inner rotatable driving member and said inner rotatable driven member; and said plurality of spline teeth of said second rigid portion of said outer rotatable intermediate member being disposed in non-contact relation with said plurality of spline teeth connected to said outer rotatable driving member, said compliant portion of said outer rotatable intermediate member being deformable to permit said plurality of spline teeth of said second rigid portion of said outer rotatable intermediate member to move into contact with said plurality of spline teeth connected to said outer rotatable member upon the occurrence of a predetermined magnitude of torque between said outer rotatable driving member and said outer rotatable driven member.

5. The coupling of claim 4, wherein:
said first, second, third and fourth axes of rotation are disposed on a common axis of rotation.

6. The coupling of claim 4, wherein:
said inner rotatable driving member and said outer rotatable driven member are rotatable in opposite directions about a common axis of rotation.

7. The coupling of claim 4, wherein:
said inner and outer rotatable intermediate members are interchangeable.

8. The coupling of claim 7 wherein:
said inner and outer rotatable intermediate members are identical.

* * * * *